United States Patent
Shin et al.

(10) Patent No.: US 9,767,808 B2
(45) Date of Patent: Sep. 19, 2017

(54) METHOD AND APPARATUS OF SUPPRESSING VOCODER NOISE

(71) Applicant: Samsung Electronics Co. Ltd., Suwon-si, Gyeonggi-do (KR)

(72) Inventors: Yong-Won Shin, Suwon-si (KR); Joon-Sang Ryu, Suwon-si (KR); Jung-In Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 737 days.

(21) Appl. No.: 13/951,946

(22) Filed: Jul. 26, 2013

(65) Prior Publication Data

US 2014/0229173 A1    Aug. 14, 2014

(30) Foreign Application Priority Data

Feb. 12, 2013    (KR) .................. 10-2013-0014781

(51) Int. Cl.
*G10L 21/00* (2013.01)
*G10L 19/005* (2013.01)
*G10L 19/22* (2013.01)
*H04L 1/00* (2006.01)

(52) U.S. Cl.
CPC ............ *G10L 19/005* (2013.01); *G10L 19/22* (2013.01); *H04L 1/0036* (2013.01); *H04L 1/0061* (2013.01); *H04L 1/0082* (2013.01)

(58) Field of Classification Search
CPC .............................. G10L 21/02; G10L 19/005
USPC .................................................. 704/201, 228
See application file for complete search history.

(56) References Cited

U.S. PATENT DOCUMENTS

| | | | | |
|---|---|---|---|---|
| 5,864,799 A * | 1/1999 | Corretjer | ............... | G10L 19/012 704/228 |
| 6,122,607 A * | 9/2000 | Ekudden | ............... | G10L 19/005 704/212 |
| 6,665,637 B2 * | 12/2003 | Bruhn | ............... | G10L 19/005 704/200.1 |
| 6,922,797 B2 * | 7/2005 | Joncour | ............... | H04L 1/0061 375/146 |
| 2003/0163305 A1 * | 8/2003 | Cheng | ............... | G10L 19/018 704/219 |
| 2004/0128128 A1 * | 7/2004 | Wang | ............... | G10L 19/005 704/229 |
| 2012/0296656 A1 * | 11/2012 | Smyth | ............... | G10L 19/22 704/500 |

* cited by examiner

*Primary Examiner* — Shaun Roberts
(74) *Attorney, Agent, or Firm* — Jefferson IP Law, LLP

(57) ABSTRACT

A method and apparatus for suppressing vocoder noise are provided. In the method, first information and second information are received from a channel decoder, the first information indicating whether a decoded data frame has an error and the second information being a channel quality metric, error concealment voice decoding is performed on the decoded data frame if the first information indicates that no channel decoding error has been generated and the second information is smaller than a predetermined first threshold, and normal voice decoding is performed on the decoded data frame if the first information indicates that no channel decoding error has been generated and the second information is equal to or larger than the first threshold.

17 Claims, 6 Drawing Sheets

METHOD AND APPARATUS OF SUPPRESSING VOCODER NOISE

PRIORITY

This application claims the benefit under 35 U.S.C. §119(a) of a Korean patent application filed on Feb. 12, 2013 in the Korean Intellectual Property Office and assigned Serial No. 10-2013-0014781, the entire disclosure of which is hereby incorporated by reference.

BACKGROUND OF THE INVENTION

1. Field of the Invention

The present invention relates to voice decoding. More particularly, the present invention relates to a method and apparatus of suppressing voice noise in a voice decoder.

2. Description of the Related Art

The term "vocoder" refers to a device that functions as both a voice encoder and a voice decoder. The vocoder is configured to transmit data including parameters generated by analyzing the characteristics of a voice signal and to synthesize speech based on parameters of received data.

Data transmitted over a communication network, particularly a wireless communication network that transmits and receives signals on radio channels or an Internet Protocol (IP) network, may be received with transmission errors due to a radio propagation environment. Therefore, a vocoder that is used in such a mobile communication environment generally has a speech synthesizing function that suffers a transmission/reception error environment and creates an output that is unperceivable to a user.

Accordingly, the vocoder typically includes an Error Concealment Unit (ECU) block that operates upon generation of an error in received data. In general, a channel decoder determines whether received packet data has an error by checking the Cyclic Redundancy Check (CRC) of the packet data and outputs a Bad Frame Indicator (BFI) indicating the CRC check result. The vocoder determines whether to operate the ECU block based on the BFI.

The ECU block increases the level of perceivable sound quality by repeating the audio signal of a previous frame or interpolating between a current frame and a previous frame depending on whether received packet data has an error. That is, the vocoder may reuse the audio signal of a previous frame transmitted with high quality or generate a new audio signal by interpolating between a high-quality audio signal and a low-quality audio signal.

In a low-quality wireless environment, the probability of generating a false alarm may be increased during decoding at a channel decoder. Upon generation of a false alarm, the vocoder may synthesize speech using abnormal packet data or may perform an unnecessary ECU operation on normal packet data. Moreover, the ECU operation of repeating a previous audio signal or interpolating between signals causes modulation noise, which in turn further degrades the sound quality. Accordingly, if the decoding performance of the channel decoder does not satisfy at least a predetermined level, speech is not synthesized normally with an ECU block.

Therefore, a need exists for an improved apparatus and method for suppressing vocoder noise in a low-quality wireless environment The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus to suppress vocoder noise in a poor wireless environment.

Another aspect of the present invention is to provide a method and apparatus to compensate the voice quality of synthesized speech during abnormal decoding at a channel decoder.

Another aspect of the present invention is to provide a method and apparatus to prevent a false alarm in a channel decoder.

A further aspect of the present invention is to provide a method and apparatus to improve the voice quality of synthesized speech according to information received from a channel decoder.

In accordance with an aspect of the present invention a method of suppressing vocoder noise is provided. The method includes receiving first information and second information from a channel decoder, the first information indicating whether a decoded data frame has an error and the second information being a channel quality metric, performing error concealment voice decoding on the decoded data frame if the first information indicates that no channel decoding error has been generated and the second information is smaller than a predetermined first threshold, and performing normal voice decoding on the decoded data frame if the first information indicates that no channel decoding error has been generated and the second information is equal to or larger than the first threshold.

In accordance with another aspect of the present invention, an apparatus for suppressing vocoder noise is provided. The apparatus includes a channel decoder configured to output first information and second information, the first information indicating whether a decoded data frame has an error and the second information being a channel quality metric, a pre-processor configured to change the first information to indicate generation of a channel decoding error if the first information indicates that no channel decoding error has been generated and the second information is smaller than a predetermined first threshold, and a voice decoder configured to perform error concealment voice decoding on the decoded data frame if the first information received from the pre-processor indicates that a channel decoding error has been generated and to perform normal voice decoding on the decoded data frame if the first information received from the pre-processor indicates that no channel decoding error has been generated.

In accordance with another aspect of the present invention, a method of suppressing vocoder noise is provided. The method includes receiving first information and second information from a channel decoder, the first information indicating whether a decoded data frame has an error and the second information being a channel quality metric, and selectively controlling sound volume of an audio signal generated from a voice decoder according to the first information and the second information.

In accordance with another aspect of the present invention, an apparatus for suppressing vocoder noise is provided. The apparatus includes a channel decoder configured to output a decoded data frame, first information, and second information, the first information indicating whether the decoded data frame has an error and the second information being a channel quality metric, and a volume controller configured to selectively control sound volume of an audio signal generated from a voice decoder according to the first information and the second information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
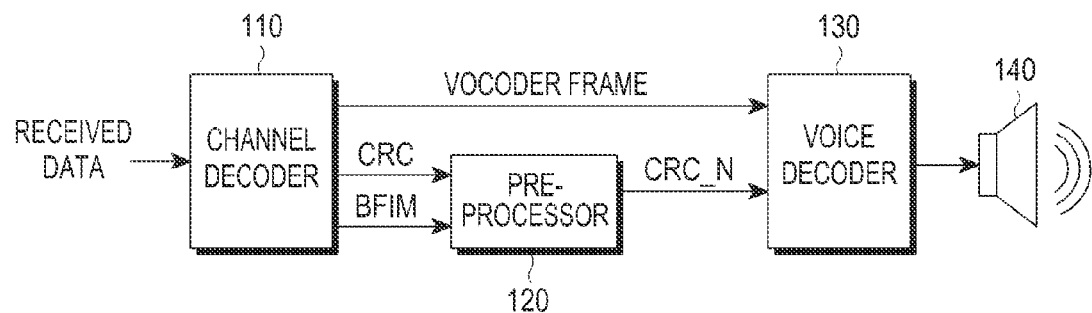
FIG. 1 is a block diagram of an apparatus to suppress vocoder noise according to an exemplary embodiment of the present invention.

FIG. 1 is a block diagram of an apparatus to suppress vocoder noise according to an exemplary embodiment of the present invention.

Referring to FIG. 1, a channel decoder 110 receives data on a channel. The format of the received data may vary depending on a used communication scheme and a system configuration. For example, in wireless communication, the channel decoder 110 may receive data through a Radio Frequency (RF) unit that receives the data from a transmitter and a demodulator that demodulates the data.

The channel decoder 110 channel-decodes the received data. More specifically, the channel decoder 110 generates a vocoder frame by decoding the received data using a decoding algorithm corresponding to an encoding algorithm of the transmitter, checks the Cyclic Redundancy Check (CRC) of the vocoder data, and outputs a Bad Frame Indicator (BFI), that is, a CRC check result (hereinafter, referred to as a CRC) indicating whether the vocoder data has an error. A vocoder frame may be 20ms long for use in a general vocoder.

The channel decoder 110 outputs a BFI Metric (BFIM) representing a decoding quality based on the decoding result of the received data. The BFIM is generally generated during decoding, requiring no additional computation. The BFIM may be expressed as a real number within a predetermined range and corresponds to the frequency of decoding errors. That is, a lower BFIM value indicates that a decoding error is generated more frequently, which in turn indicates a lower quality channel.

A voice decoder 130 receives the vocoder frame and a pre-processor 120 at the front end of the voice decoder 130 receives the CRC and the BFIM. Previously, a CRC representing a BFI is directly provided to the voice decoder 130. In contrast, the pre-processor 120 processes the CRC, taking into account the BFIM in an exemplary embodiment of the present invention.

More specifically, if the BFIM representing a channel quality is smaller than a predetermined threshold, the pre-processor 120 changes the CRC to a value indicating 'Bad', determining that the CRC is not reliable and provides the changed CRC to the voice decoder 130. On the contrary, if the BFIM is equal to or larger than the threshold, the channel decoder 110 may provide the CRC simply to the voice decoder 130 without changing the CRC. The CRC processed by the pre-processor 120 is denoted by CRC_N.

The voice decoder 130 performs voice decoding on the vocoder frame received from the channel decoder 110 based on CRC_N received from the pre-processor 120. More specifically, if CRC_N is Good, the voice decoder 130 processes the vocoder frame by normal decoding. On the other hand, if CRC_N is Bad, the voice decoder 130 processes the vocoder frame by a known Error Concealment Unit (ECU) function. According to the ECU function, the voice decoder 130 repeats the audio signal of a previous frame in a current frame or generates a new audio signal by interpolating between the audio signal of the current frame and the audio signal of the previous frame.

A Digital to Analog Converter (DAC) (not shown) converts the audio signal received from the voice decoder 130 to an analog signal and outputs the analog signal through a speaker 140.

In this manner, the exemplary embodiment of the present invention provides a technique of compensating the voice quality of synthesized speech when a normal ECU operation is impossible due to a decoding error of the channel decoder 110 in a poor wireless environment. If the channel decoder 110 mistakes abnormal received data for normal data, the voice decoder 130 generates an audio signal by speech synthesis intended for normal data. In general, since a packet error generated in a weak-field environment is bursty, a channel decoding error is a significant cause of the degradation of synthesis performance and sound quality. If errors are successively generated and initial erroneous data is mistaken for normal data, a noise audio signal may be generated across a plurality of successive frames during a subsequent ECU operation.

In an exemplary embodiment of the present invention, the frequency of noise generation is reduced by pre-processing a CRC received from the channel decoder 110 before the voice decoder 130. Therefore, noise-incurred errors may be reduced during the processing of received speech.

Figure 2:
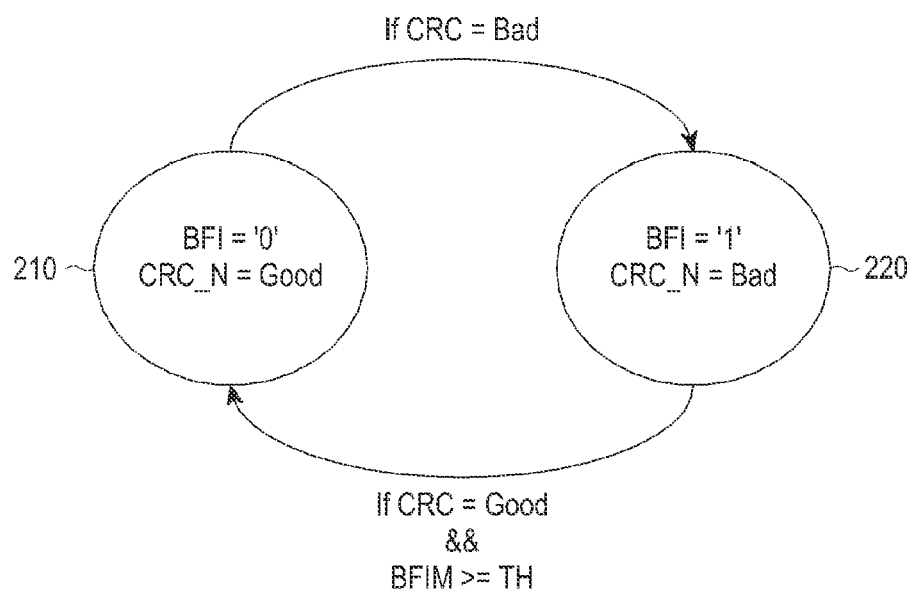
FIG. 2 is a state transition diagram illustrating pre-processing for voice decoding according to an exemplary embodiment of the present invention.

FIG. 2 is a state transition diagram illustrating pre-processing for voice decoding according to an exemplary embodiment of the present invention.

Referring to FIG. 2, a first state 210 is a state where a CRC output from the channel decoder 110 is 'Good', that is, a BFI is '0'. Upon generation of a CRC='Bad' in the first state 210 in the channel decoder 110, the first state 210 is transitioned to a second state 220. The second state 220 means that the CRC is 'Bad', that is, the BFI is '1'. If the CRC is 'Good' and the BFIM is equal to or higher than a predetermined threshold TH in the second state 220 in the channel decoder 110, the second state 220 is transitioned to the first state 210.

In this manner, the pre-processor 120 receives a CRC and a BFIM from the channel decoder 110 and provides a modified BFI, that is, CRC_N to the voice decoder 130. If the BFIM gets smaller than the threshold TH, even though the received CRC is 'Good', the pre-processor 120 changes the CRC to 'Bad' and provides the changed CRC to the voice decoder 130. The threshold that is compared with the BFIM may be set appropriately according to the performance of the channel decoder 110 and/or the voice decoder 130 and the characteristics of a device to which the present invention is applied. For example, the threshold may be empirically set according to the characteristics of elements.

Figure 3:
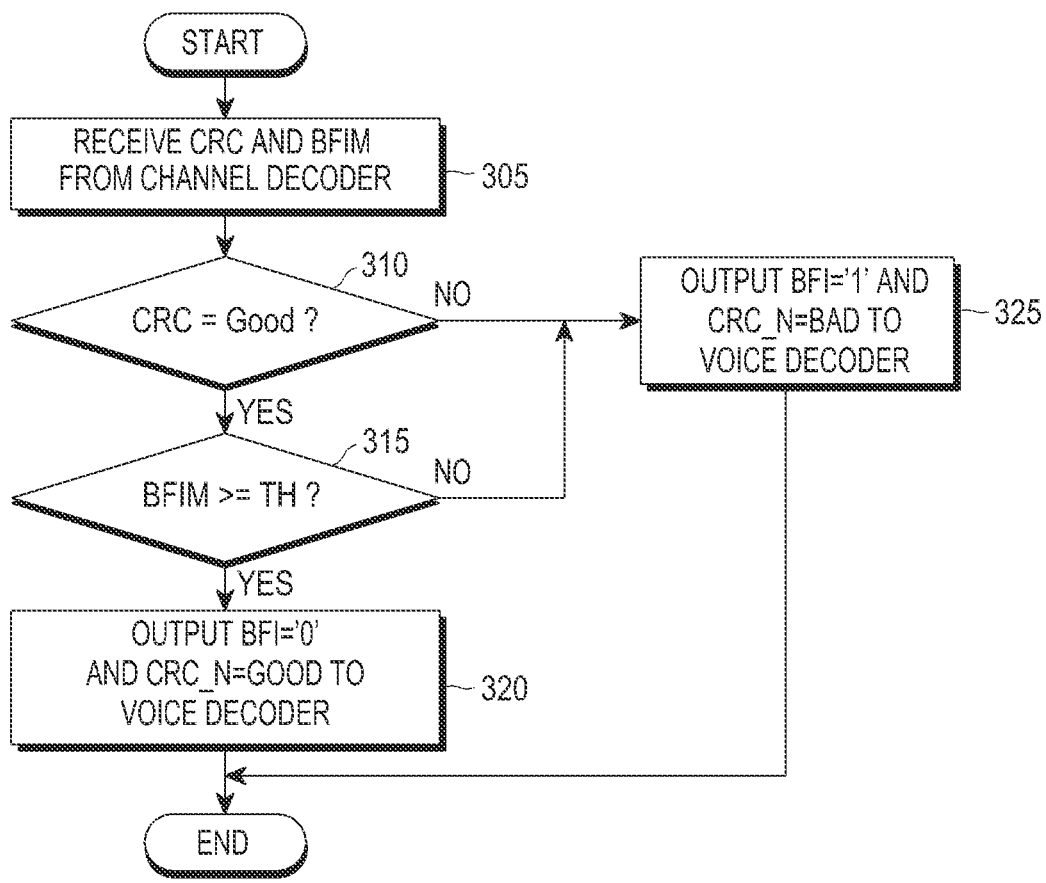
FIG. 3 is a flowchart illustrating a pre-processing operation for voice decoding according to an exemplary embodiment of the present invention.

FIG. 3 is a flowchart illustrating a pre-processing operation for voice decoding according to an exemplary embodiment of the present invention.

Referring to FIG. 3, the pre-processor 120 receives a CRC representing the BFI of decoded data and a BFIM representing a channel quality from the channel decoder 110 in step 305. If a channel decoding error has been generated, the CRC is set to 'Bad' (i.e., BFI=1) and if no channel decoding has been generated, the CRC is set to 'Good' (i.e., BFI=0). The BFIM is a metric representing the quality of the channel.

The pre-processor 120 determines whether the CRC is 'Good' in step 310. If the CRC is 'Good', the pre-processor 120 goes to step 315. If the CRC is 'Bad', the pre-processor 120 goes to step 325. In step 325, the pre-processor 120 sets the BFI to '1' and CRC_N to 'Bad' and provides the BFI and CRC_N to the voice decoder 130. The voice decoder 130 performs voice decoding on the erroneous vocoder frame in response to the BFI and/or CRC_N.

In step 315, the pre-processor 120 compares the BFIM with a predetermined threshold TH. If the BFIM is smaller than the threshold TH, the pre-processor 120 provides CRC_N set to 'Bad' to the voice decoder 130 in step 325, even though the CRC received from the channel decoder 110 is 'Good'. When the BFIM is small, this means a poor channel environment. Therefore, if normal voice decoding is performed on the current vocoder frame, sound quality may be degraded.

On the contrary, if the BFIM is equal to or larger than the threshold TH, the pre-processor 120 sets the BFI to '0' and CRC_N to 'Good' and provides the BFI and/or CRC_N to the voice decoder 130 in step 320. The voice decoder 130 performs voice decoding on the normal vocoder frame in response to the BFI and/or CRC_N. That is, only when the pre-processor 120 determines that the BFIM is relatively high, and thus the channel environment is good, does it perform a normal voice decoding procedure.

Figure 4:
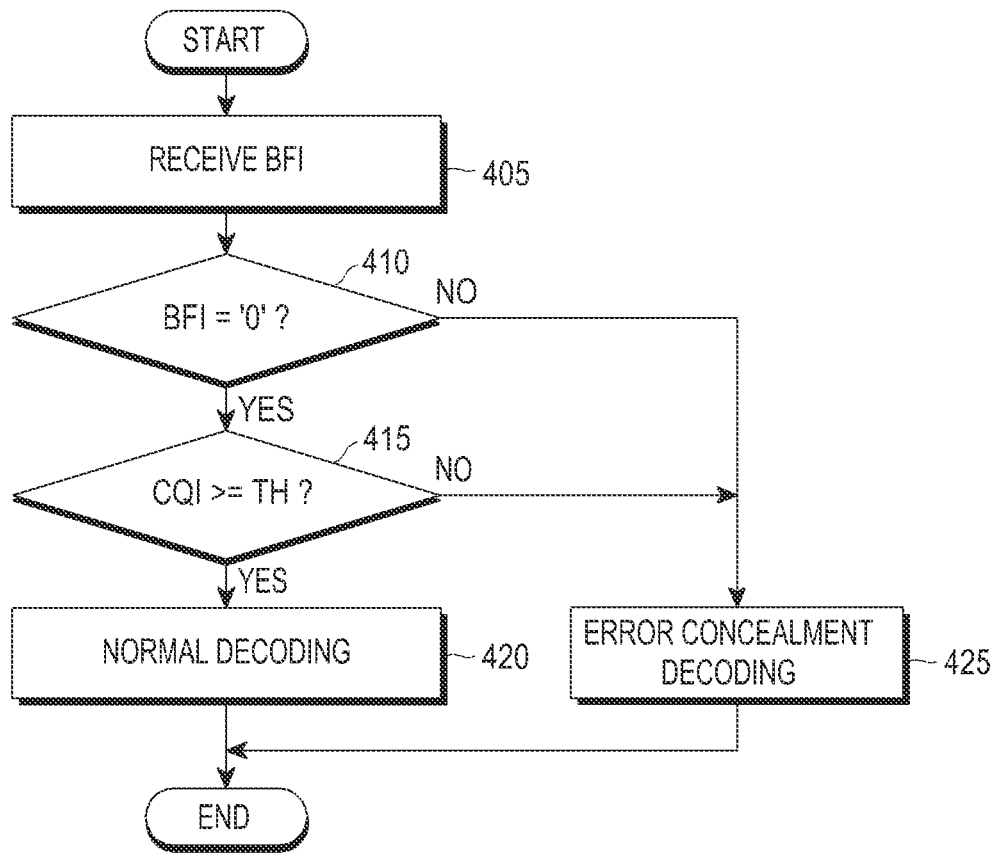
FIG. 4 is a flowchart illustrating a voice decoding operation according to an exemplary embodiment of the present invention.

FIG. 4 is a flowchart illustrating a voice decoding operation according to an exemplary embodiment of the present invention.

In the voice decoding operation depicted in FIG. 4, the voice decoder determines a voice decoding scheme according to a BFI received from the channel decoder. The following exemplary operation may be implemented in an internal function block of the voice decoder or the pre-processor function block added at the front end of the voice decoder.

Referring to FIG. 4, the voice decoder receives a BFI from the channel decoder in step 405. If a channel decoding error has been generated, the BFI is set to '1' and if no channel decoding error has been generated, the BFI is set to '0'. The BFI may be set based on a CRC check of a channel decoding result.

In step 410, the voice decoder determines whether the BFI is '0'. If the BFI is '0', the voice decoder goes to step 415 and otherwise, the voice decoder goes to step 425. The voice decoder performs an error concealment decoding in step 425. The error concealment decoding is, for example, a process of repeating an audio signal of a previous frame or generating a new audio signal by interpolating between an audio signal of a previous frame and an audio signal of a current frame.

In step 415, the voice decoder determines a channel state by comparing a separately acquired Channel Quality Indicator (CQI) with a predetermined threshold. The CQI is a parameter representing a channel state. In an exemplary embodiment of the present invention, the channel decoder may generate the CQI. In another exemplary embodiment of the present invention, the CQI may be a measurement of a radio signal measured by an additional measurer, for example, a Bit Error Rate (BER), a Block Error Ratio (BLER), a Signal to Noise Ratio (SNR), a Carrier to Interference and Noise Ratio (CINR), a Received Signal Code Power (RSCP), etc.

If the CQI is smaller than the threshold, the voice decoder performs error concealment decoding in step 425. When the CQI is small, this means a poor channel environment. Therefore, normal voice decoding of the current vocoder frame may result in degradation of sound quality.

On the other hand, if the CQI is equal to or larger than the threshold, the voice decoder performs voice decoding on the normal vocoder frame in step 420. That is, only when determining that the CQI is relatively high, and thus the channel environment is good, does the voice decoder perform normal voice decoding.

Figure 5:
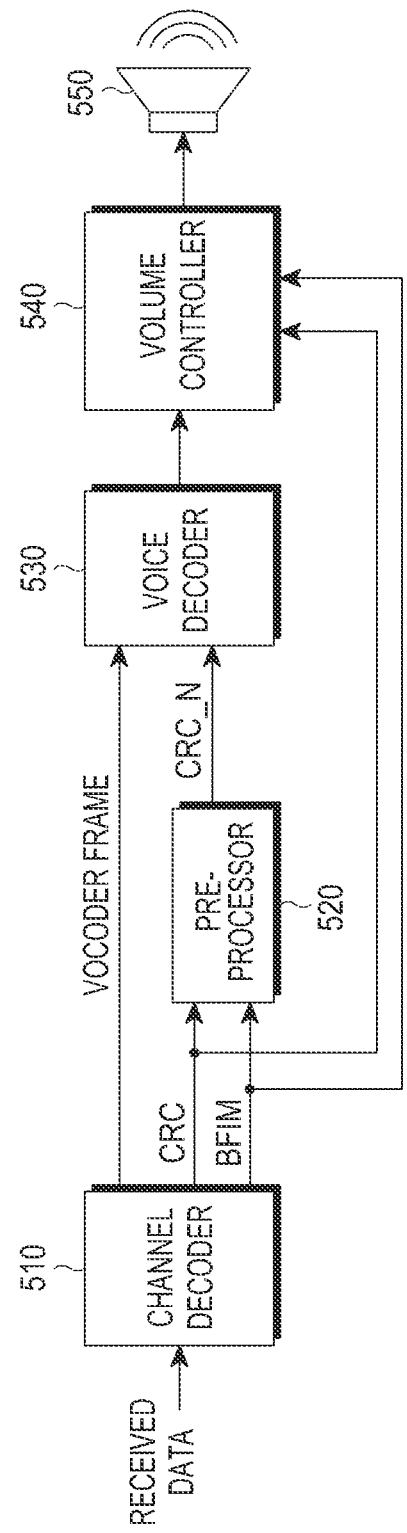
FIG. 5 is a block diagram of an apparatus to reduce the sound volume of an audio signal in a poor wireless environment according to an exemplary embodiment of the present invention.

FIG. 5 is a block diagram of an apparatus to reduce the sound volume of an audio signal in a poor wireless environment according to an exemplary embodiment of the present invention.

Referring to FIG. 5, a channel decoder 510 receives data received on a channel. The format of the received data may vary depending on a used communication scheme and a system configuration. For example, in wireless communication, the channel decoder 510 may receive data through an RF unit that receives the data from a transmitter and a demodulator that demodulates the data.

The channel decoder 510 channel-decodes the received data. More specifically, the channel decoder 510 generates a vocoder frame by decoding the received data in a decoding algorithm corresponding to an encoding algorithm used in the transmitter, performs a CRC check on the vocoder frame, and outputs a BFI indicating whether the vocoder data has an error, that is, a CRC result (referred to as a CRC).

In addition, the channel decoder 510 outputs a BFIM representing a decoding quality based on a decoding result of the received data. The vocoder frame is provided to a voice decoder 530 and the CRC and BFIM are provided to a volume controller 540 at the rear end of the voice decoder 530. In an alternative exemplary embodiment, the CRC and BFIM may be provided to a pre-processor 520 at the front end of the voice decoder 530. The pre-processor 520 operates as described before and thus its detailed description is not provided herein. While both the pre-processor 520 and the volume controller 540 are used in FIG. 5, it is obvious that only one of the pre-processor 520 and the volume controller 540 may be included.

The voice decoder 530 performs voice decoding on the vocoder frame received from the channel decoder 510 based on the CRC received directly from the channel decoder 510 or through the pre-processor 520. More specifically, if the CRC is 'Good', the voice decoder 530 processes the vocoder frame by normal decoding. On the contrary, if the CRC is 'Bad', the voice decoder 530 processes the vocoder frame by a known ECU function.

An audio signal generated from the voice decoder 530 is provided to the volume controller 540. The volume controller 540 determines a volume gain for the audio signal based on the CRC and BFIM received from the channel decoder 510 and applies the determined volume gain to the audio signal. The operation of the volume controller 540 is described later in greater detail. A DAC (not shown) converts a signal received from the volume controller 540 to an analog signal and outputs the analog signal through a speaker 550.

The volume controller 540 performs a Dynamic Volume Control (DVC) operation by eliminating a noise component from the audio signal synthesized by the voice decoder 530 based on the CRC and BFIM. The DVC is a process of determining a weight for use in volume control according to a change in the BFIM in a poor wireless channel environment and a change in the CRC according to a channel decoding result and adjusting the level of an audio signal. The change rate of the volume gain based on the change of a radio channel environment may be adjusted according to the characteristics of a device. Volume control may be performed, taking into account the CRC results of a predetermined number (N) of frames. In DVC, it is determined based on the BFIM whether to control sound volume. If the BFIM is smaller than a predetermined threshold (i.e., a poor channel quality), the sound volume is controlled and the volume gain is adjusted according to a CRC based on a channel decoding result.

Figure 6:
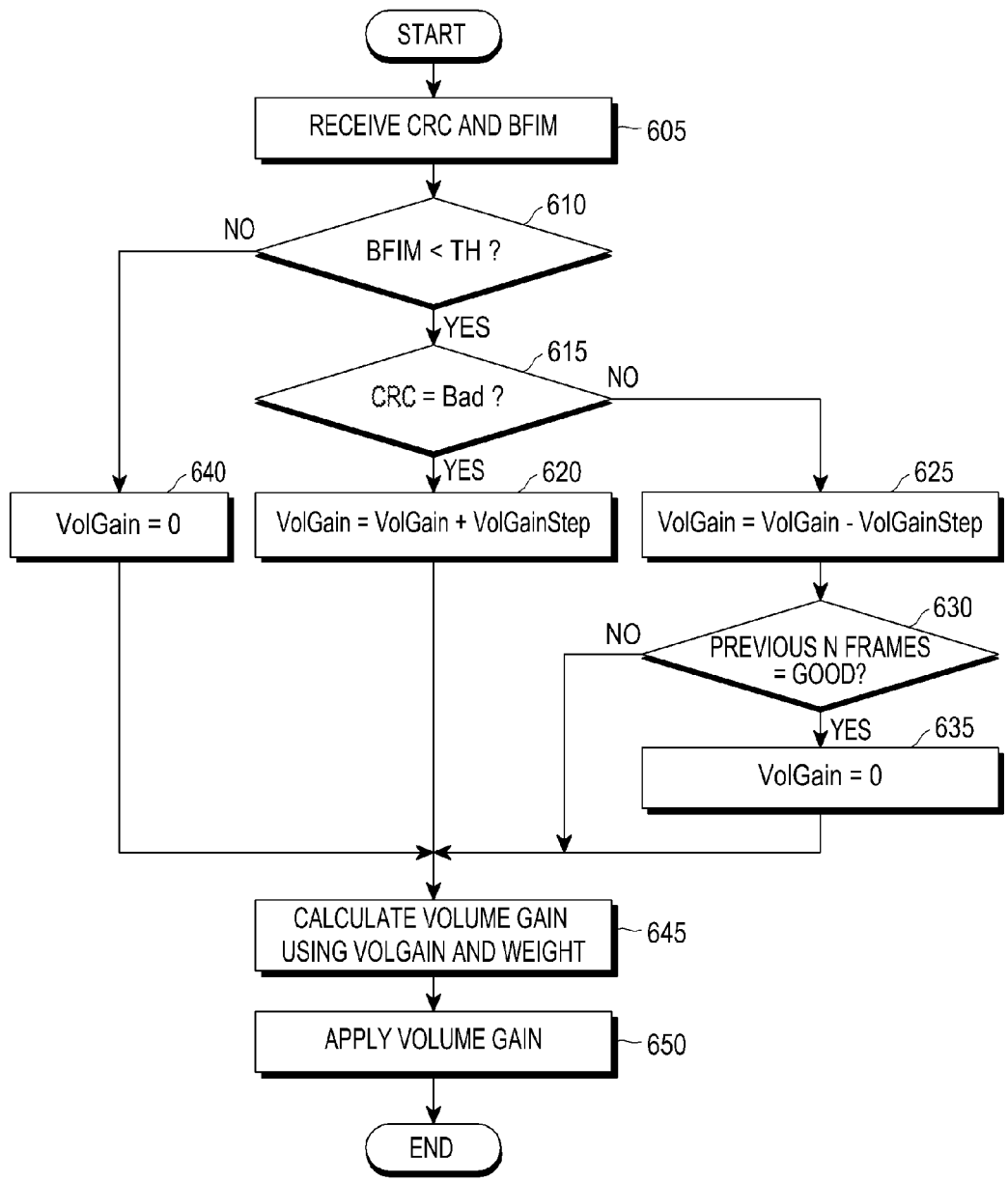
FIG. 6 is a flowchart illustrating an operation to control the sound volume of an audio signal according to an exemplary embodiment of the present invention.

FIG. 6 is a flowchart illustrating an operation to control the sound volume of an audio signal according to an exemplary embodiment of the present invention.

Referring to FIG. 6, the volume controller 540 receives a CRC representing a BFI resulting from channel decoding and a BFIM representing a channel quality from the channel decoder 510 and stores the CRC and BFIM in buffers in step 605. If a channel decoding error has been generated, the CRC is set to 'Bad' (i.e., BFI=1) and if no channel decoding error has been generated, the CRC is set to 'Good' (i.e., BFI=0). The BFIM is a metric indicating how good the channel quality is. CRCs and BFIMs may be buffered during a predetermined window of time, for example, N frames.

In step 610, the volume controller 540 compares the BFIM with a predetermined threshold. If the BFIM is smaller than the threshold, the volume controller 540 goes to step 615. Otherwise, the volume controller 540 goes to step 640. In step 640, since the channel quality is good, the volume controller 540 sets a parameter indicating a volume decrement VolGain to 0. The volume controller 540 determines whether the CRC is 'Bad' in step 615. If the CRC is 'Bad', the volume controller 540 goes to step 620 and if the CRC is 'Good', the volume controller 540 goes to step 625.

In step 620, since the channel quality is poor and a channel decoding error has been generated, the volume controller 540 increases the volume decrement VolGain by a predetermined unit VolGainStep. In step 625, since the channel quality is poor but no channel decoding error has been generated, the volume controller 540 decreases the volume decrement VolGain by the predetermined unit VolGainStep and goes to step 630.

The volume controller 540 determines whether the CRCs of previous N successive frames are 'Good' in step 630. If the CRCs are all 'Good', the volume controller 540 sets the volume decrement VolGain to 0 in step 635. On the other hand, if at least one of the CRCs of the previous N successive frames is 'Bad', the volume controller 540 proceeds to step 645 without setting the volume decrement VolGain to an initial value.

In step 645, the volume controller 540 calculates a volume gain to be applied to an audio signal using the volume decrement VolGain set in one of steps 640, 620, 625, and 635. The volume controller 540 may further consider a predetermined weight in calculating the volume gain. The weight is set based on CRCs and BFIMs accumulated for a predetermined number of frames. In an exemplary embodiment of the present invention, if CRCs more than N1 are 'Bad' in the latest N frames or BFIMs more than N1 are smaller than a predetermined low threshold in the latest N frames, the weight may be set to a predefined large value. Otherwise, the weight may be set to a relatively small value. The lower threshold is far smaller than the threshold used in step 610.

In step 650, the volume controller 540 applies the calculated volume gain to an audio signal synthesized by the voice decoder 530. If a BFIM is low and a CRC is 'Bad', the volume of the audio signal is decreased by a large level. If the BFIM is low and the CRC is 'Good', the volume of the audio signal is decreased by a relatively small level. If the CRCs of the latest N frames are 'Good' despite a low BFIM, the volume of the audio signal is not decreased.

Figure 7A:
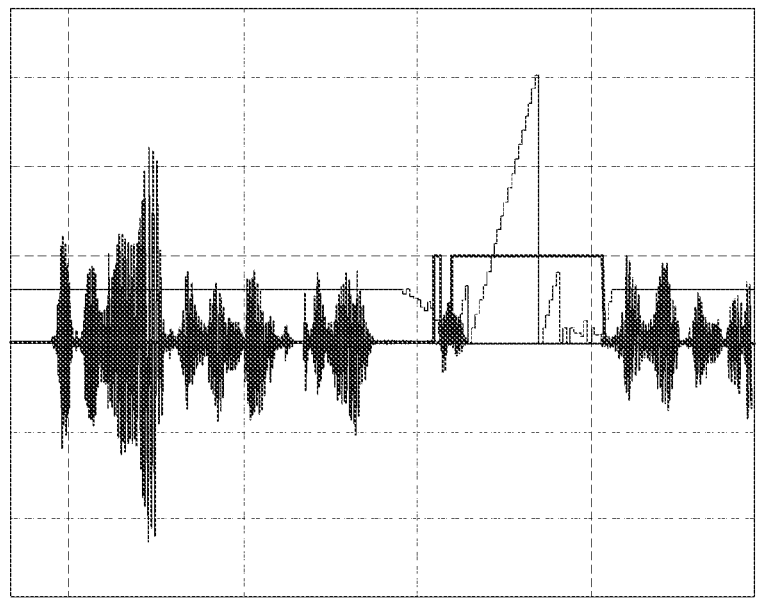
FIGS. 7A and 7B illustrate improvement of the sound quality of an audio signal according to an exemplary embodiment of the present invention.
Figure 7B:
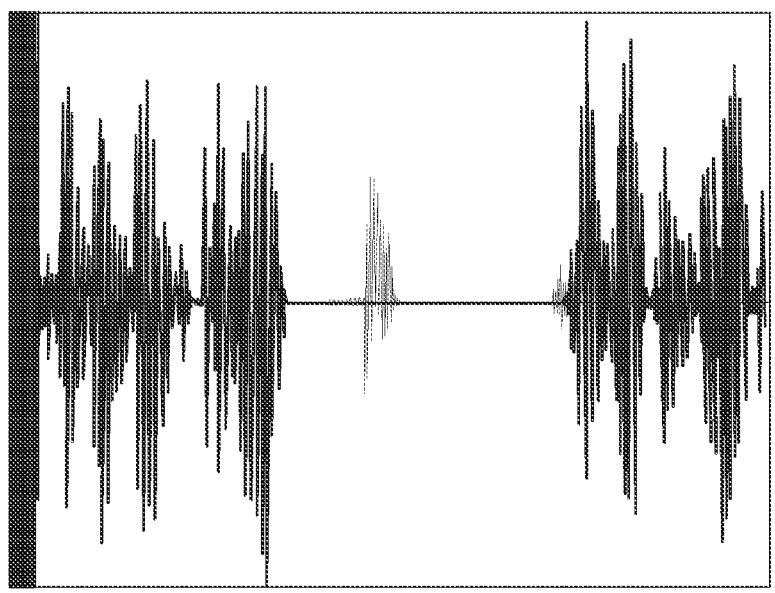

FIGS. 7A and 7B illustrate improvement of the sound quality of an audio signal according to an exemplary embodiment of the present invention.

FIG. 7A illustrates the waveform of an audio signal containing noise due to a false alarm of error detection, when pre-processing and post-processing are not performed for a voice decoder and FIG. 7B illustrates the waveform of an audio signal from which noise is eliminated, when pre-processing and post-processing are performed for a voice decoder according to an exemplary embodiment of the present invention.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of suppressing vocoder noise, the method comprising:
   receiving first information and second information from a channel decoder, the first information indicating whether a decoded data frame has an error and the second information being a channel quality metric;
   identifying whether the decoded data frame has an error based on the first information;
   if it is identified that the decoded data frame does not have an error, identifying whether the channel quality metric is smaller than a predetermined first threshold based on the second information;
   if it is identified that the channel quality metric is smaller than the first threshold, performing error concealment voice decoding on the decoded data frame; and
   if it is identified that the channel quality metric is equal to or greater than the first threshold, performing normal voice decoding on the decoded data frame,
   wherein the performing of the error concealment voice decoding comprises generating a new audio signal by interpolating between an audio signal of a current frame and an audio signal of a previous frame.

2. The method of claim 1, further comprising performing error concealment voice decoding on the decoded data frame if it is identified that the decoded data frame has an error.

3. The method of claim 1, further comprising selectively controlling sound volume of an audio signal generated from one of the error concealment voice decoding and the normal voice decoding according to the first information and the second information.

4. The method of claim 1, further comprising:
   increasing a volume gain parameter by a predetermined unit if the second information is smaller than a predetermined second threshold and the first information indicates that a channel decoding error has been generated;
   decreasing the volume gain parameter by the predetermined unit if the second information is smaller than the second threshold and the first information indicates that no channel decoding error has been generated;
   setting the volume gain parameter to 0 if the second information is equal to or greater than the second threshold or no channel decoding error has been generated for a predetermined number of previous frames;
   calculating a volume gain according to the volume gain parameter; and
   applying the calculated volume gain to an audio signal generated from one of the error concealment voice decoding and the normal voice decoding.

5. The method of claim 4, wherein the calculating of the volume gain comprises taking into account a weight, wherein the weight is set based on first and second information accumulated for a predetermined number of frames.

6. The method of claim 1, wherein the first information comprises a result of a Cyclic Redundancy Check and the second information comprises at least one of a Bit Error Rate, a Block Error Ratio, a Signal to Noise Ratio, a Carrier to Interference and Noise Ratio, and a Received Signal Code Power.

7. An apparatus for suppressing vocoder noise, the apparatus comprising:
   a channel decoder configured to output first information and second information, the first information indicating whether a decoded data frame has an error and the second information being a channel quality metric;
   a pre-processor configured to change the first information to indicate generation of a channel decoding error if the first information indicates that no channel decoding error has been generated and the second information is smaller than a predetermined first threshold; and
   a voice decoder configured to perform error concealment voice decoding on the decoded data frame if the first information received from the pre-processor indicates that a channel decoding error has been generated and to perform normal voice decoding on the decoded data frame if the first information received from the pre-processor indicates that no channel decoding error has been generated,
   wherein the voice decoder performs error concealment voice decoding by generating a new audio signal by interpolating between an audio signal of a current frame and an audio signal of a previous frame.

8. The apparatus of claim 7, further comprising a volume controller configured to selectively control sound volume of an audio signal generated from one of the error concealment voice decoding and the normal voice decoding according to the first information and the second information.

9. The apparatus of claim 8, wherein the volume controller increases a volume gain parameter by a predetermined unit if the second information is smaller than a predetermined second threshold and the first information indicates that a channel decoding error has been generated, decreases the volume gain parameter by a predetermined unit if the second information is smaller than the second threshold and the first information indicates that no channel decoding error has been generated, sets the volume gain parameter to 0 if the second information is equal to or greater than the second threshold or no channel decoding error has been generated for a predetermined number (N) of previous frames, calculates a volume gain according to the volume gain parameter, applies the calculated volume gain to an audio signal generated from one of the error concealment voice decoding and the normal voice decoding, and outputs the audio signal through a speaker.

10. The apparatus of claim 9, wherein the volume controller calculates the volume gain by taking into account a weight, wherein the weight is set based on first and second information accumulated for a predetermined number of frames.

11. The apparatus of claim 7, wherein the first information comprises a result of a Cyclic Redundancy Check and the second information comprises at least one of a Bit Error Rate, a Block Error Ratio, a Signal to Noise Ratio, a Carrier to Interference and Noise Ratio, and a Received Signal Code Power.

12. A method of suppressing vocoder noise, the method comprising:
   receiving first information and second information from a channel decoder, the first information indicating whether a decoded data frame has an error and the second information being a channel quality metric; and selectively controlling sound volume of an audio signal generated from a voice decoder according to the first information and the second information, wherein the selectively controlling of the sound volume comprises:

increasing a volume gain parameter by a predetermined unit if the second information is smaller than a predetermined second threshold and the first information indicates that a channel decoding error has been generated;

decreasing the volume gain parameter by a predetermined unit if the second information is smaller than the second threshold and the first information indicates that no channel decoding error has been generated;

setting the volume gain parameter to 0 if the second information is equal to or greater than the second threshold;

calculating a volume gain according to the volume gain parameter by decreasing the volume gain according to a size of the volume gain parameter;

after the decreasing of the volume gain parameter and prior to the calculating of the volume gain, determining whether no channel decoding error has been generated for a predetermined number of previous frames and setting the volume parameter to 0 if no channel decoding error has been generated for the predetermined number of previous frames; and applying the calculated volume gain to the audio signal generated from the voice decoder, wherein a greater value of the second information represents better channel quality.

13. The method of claim 12, wherein the calculating of the volume gain comprises taking into account a weight, wherein the weight is set based on first and second information accumulated for a predetermined number of frames.

14. The method of claim 12, wherein the first information comprises a result of a Cyclic Redundancy Check and the second information comprises at least one of a Bit Error Rate, a Block Error Ratio, a Signal to Noise Ratio, a Carrier to Interference and Noise Ratio, and a Received Signal Code Power.

15. An apparatus for suppressing vocoder noise, the apparatus comprising:

a channel decoder configured to output a decoded data frame, first information, and second information, the first information indicating whether the decoded data frame has an error and the second information being a channel quality metric; and a volume controller configured to:

selectively control sound volume of an audio signal generated from a voice decoder according to the first information and the second information, increase a volume gain parameter by a predetermined unit, if the second information is smaller than a predetermined second threshold and the first information indicates that a channel decoding error has been generated, decrease the volume gain parameter by a predetermined unit, if the second information is smaller than the second threshold and the first information indicates that no channel decoding error has been generated, set the volume gain parameter to 0, if the second information is equal to or greater than the second threshold, calculate a volume gain according to the volume gain parameter by decreasing the volume gain according to a size of the volume gain parameter, after the decreasing of the volume gain parameter and prior to the calculating of the volume gain, determine whether no channel decoding error has been generated for a predetermined number of previous frames and set the volume parameter to 0 if no channel decoding error has been generated for the predetermined number of previous frames, and apply the calculated volume gain to the audio signal generated from the voice decoder, and output the audio signal through a speaker, wherein a greater value of the second information represents better channel quality.

16. The apparatus of claim 15, wherein the volume controller calculates the volume gain by taking into account a weight, wherein the weight is set based on first and second information accumulated for a predetermined number of frames.

17. The apparatus of claim 15, wherein the first information comprises a result of a Cyclic Redundancy Check and the second information comprises at least one of a Bit Error Rate, a Block Error Ratio, a Signal to Noise Ratio, a Carrier to Interference and Noise Ratio, and a Received Signal Code Power.

* * * * *